United States Patent
Fisher, Jr. et al.

(10) Patent No.: US 10,137,725 B2
(45) Date of Patent: *Nov. 27, 2018

(54) TELESCOPING WRITING IMPLEMENT

(71) Applicant: Paul Cary Fisher, Boulder City, NV (US)

(72) Inventors: Paul Cary Fisher, Jr., Boulder City, NV (US); Jeffrey L. Kelsoe, Palm Desert, CA (US)

(73) Assignee: Paul Cary Fisher, Jr., Boulder City, NV (US)

( * ) Notice: Subject to any disclaimer, the term of this patent is extended or adjusted under 35 U.S.C. 154(b) by 163 days.

This patent is subject to a terminal disclaimer.

(21) Appl. No.: 15/226,821

(22) Filed: Aug. 2, 2016

(65) Prior Publication Data

US 2016/0339737 A1   Nov. 24, 2016

Related U.S. Application Data

(63) Continuation of application No. 13/790,328, filed on Mar. 8, 2013, now Pat. No. 9,415,625.

(51) Int. Cl.
| | |
|---|---|
| *B43K 24/00* | (2006.01) |
| *B43K 7/02* | (2006.01) |
| *B43K 7/12* | (2006.01) |
| *B43K 15/00* | (2006.01) |
| *B43K 23/08* | (2006.01) |
| *B43K 7/00* | (2006.01) |
| *G06F 3/039* | (2013.01) |

(52) U.S. Cl.
CPC ............. *B43K 24/00* (2013.01); *B43K 7/005* (2013.01); *B43K 7/02* (2013.01); *B43K 7/12* (2013.01); *B43K 15/00* (2013.01); *B43K 23/08* (2013.01); *G06F 3/039* (2013.01)

(58) Field of Classification Search
CPC .......... B43K 24/00; B43K 7/005; B43K 7/02; B43K 7/12; B43K 15/00; B43K 23/08; G06F 3/039
See application file for complete search history.

(56) References Cited

U.S. PATENT DOCUMENTS

| | | | |
|---|---|---|---|
| 2,518,128 A | 10/1947 | Dufilho |
| 2,571,830 A | 1/1948 | Buell |
| 2,500,979 A | 3/1950 | Leslie |
| 2,885,780 A | 5/1959 | Campbell |
| 3,652,173 A | 3/1972 | Miller et al. |

(Continued)

*Primary Examiner* — David Walczak
(74) *Attorney, Agent, or Firm* — Weide & Miller, Ltd.

(57) ABSTRACT

A telescoping writing implement that retracts the writing point when in the collapsed position. An external pen body is mechanically connected to a writing cartridge through at least one aperture in a guide tube. Movement of the external pen body downward draws the writing cartridge down inside the guide tube until the writing end of the writing cartridge is exposed and the connecting means such as a clip, screw or pin contacts the lower edge of the aperture. When the outer pen body is moved upward, it draws the writing cartridge with it inside the guide tube until the writing end is protected inside the guide tube. The limits of travel are governed by the dimensions of the aperture when the connecting means contacts the edge of the aperture. Additional elements may include an upper pen body with a pocket retainer clip and internal position detents.

19 Claims, 11 Drawing Sheets

(56) References Cited

U.S. PATENT DOCUMENTS

| | | | |
|---|---|---|---|
| 3,679,318 | A | 7/1972 | Liguori |
| 3,819,282 | A | 6/1974 | Schultz |
| 4,115,115 | A | 9/1978 | Torii |
| 4,266,881 | A | 5/1981 | Rubens |
| 6,273,627 | B1 | 8/2001 | Mittersinker |
| 6,474,889 | B2 | 11/2002 | Kato |
| 6,752,557 | B1 | 6/2004 | Hsie |
| 6,773,185 | B1 * | 8/2004 | Hsieh ............... B43K 24/04 401/104 |
| 8,087,841 | B2 | 1/2012 | Liu |
| 2011/0129285 | A1 | 6/2011 | Liu |
| 2011/0318083 | A1 | 12/2011 | Yoon |

* cited by examiner

TELESCOPING WRITING IMPLEMENT

PRIORITY CLAIM

This application is a continuation of, claims priority to and the benefit U.S. patent application Ser. No. 13/790,328 filed Mar. 8, 2013.

FIELD OF THE INVENTION

The present invention relates to writing implements, and more specifically to retracting, telescoping ball point pens and other writing apparatuses.

BACKGROUND

The use of retractable writing implements such as pens, mechanical pencils and the like is well known and widely used. One beneficial form of retractable writing implement is the telescoping pen which has the advantage of reducing the length of the pen when not being used, and then easily extending the length while simultaneously exposing the writing point for use. For example, U.S. Pat. No. 6,474,889 issued to Kato (Nov. 5, 1982) discloses a telescoping pen employing, among a large number of components, a coil spring. Similarly, U.S. Pat. No. 6,273,627 issued to Muttersinker et al. (Aug. 14, 2001) discloses an expandable pen which extends the writing tip when the pen body is extended. However, the device also requires a coil spring and a large number of other mechanical parts, increasing the cost of manufacture, and reducing lifespan and reliability.

A published U.S. Patent application (no. 2011/0129285 by Liu et al.) discloses a retractable pen that simultaneously telescopes in length and extends or retracts the writing point, but this invention also employs a spring and has a large number of parts. The cost of manufacturing pens is highly dependent on the number of components and complexity. Moreover, the use of a coil spring not only adds cost but is subject to rusting and corrosion, shortening the life and reducing reliability of the writing device.

U.S. Pat. No. 4,266,881 issued to Rubens May 12, 1981 attempts to address the high cost and lower reliability of using a spring in a writing implement, but does not disclose a telescoping device, merely a retracting pen having more than one ink cartridge. No one has previously disclosed a telescoping writing implement that extends and contracts while simultaneously exposing and retracting the writing point, without the use of a spring mechanism.

U.S. Pat. No. 2,518,128 issued to Dufilho (Oct. 14, 1927) discloses a spring-less telescoping pen or pencil having gradations and at least one non-round side, but it does not provide for retracting the writing point inside a protective body.

U.S. Pat. No. 2,571,830 issued to Buell (Jan. 2, 1948) discloses a telescoping mechanical pencil in which relative movement of two pencil bodies advances the writing lead. However, the telescoping mechanism does not shorten the overall length, does not move the writing tip back into the pencil body and, further, requires a spring.

U.S. Pat. No. 8,087,841 issued to Liu Jan. 3, 2012) discloses a retractable pen with an extending pen body. However, this invention requires a large number of individual parts (18 individual parts are disclosed), including a coil spring. The mechanism and its assembly are necessarily complex, increasing the cost of manufacture and raising the number of potential points of failure.

There is also a need to reduce the diameter of pens to allow them to fit certain applications such as inserting into writing tablet bindings, and to make them more convenient for certain users.

It is therefore an object of this invention to provide a telescoping pen that conveniently extends its length while simultaneously exposing the writing end, and reducing its length while protectively storing its writing end.

It is a further object of the present invention to provide a telescoping pen apparatus that does not require a coil spring.

It is a further object of the present invention to provide a telescoping pen with a minimum number of component parts, reducing cost of manufacture and increasing lifetime reliability.

It is a further object of the present invention to reduce the diameter of the pen body by eliminating internal components that require excessive lateral space.

SUMMARY

To fulfill the above objects, we hereby disclose a novel telescoping writing device that exposes the writing point while simultaneously extending the length of the device, and stowing the writing point while simultaneously contracting the length of the device. This is accomplished by mechanically connecting the outer body with the inner writing body through an aperture in a guide means which is slidably fit inside the outer body. Moving the outer body down moves the inner writing body down in relation to the guide means, pushing it out of a stowage tube. A minimized number of individual parts are used, construction is simple and no coil spring is employed, resulting is a cost savings, a higher degree of reliability and minimal pen diameter.

Definitions

To avoid confusion and ambiguity, and to aid in defining the scope of the invention claimed, as used herein, the following words will be given the construction denoted:

"Distal End" shall mean the end of the writing implement opposite the Writing End.

"Downward" shall mean in the direction toward the writing end.

"Upward" shall mean toward the Distal End of the writing implement.

"Writing Cartridge" shall mean any tubular writing, stylus or embossing component such as ball point pen refill, writing lead, felt-tip pen insert or touch screen stylus.

"Writing End" shall mean the end of the writing implement used for writing, drawing, embossing, or touching a surface such as a touch-sensitive screen.

DETAILED DESCRIPTION

The present invention utilizes a minimized number of parts to manufacture a telescoping writing implement, typically a ball point pen. With this device we have eliminated the need for a coil spring and have enabled the manufacture of the telescoping pen with as few as 4 to 6 parts. The low part count significantly reduces manufacturing costs and improves reliability.

Figure 1:
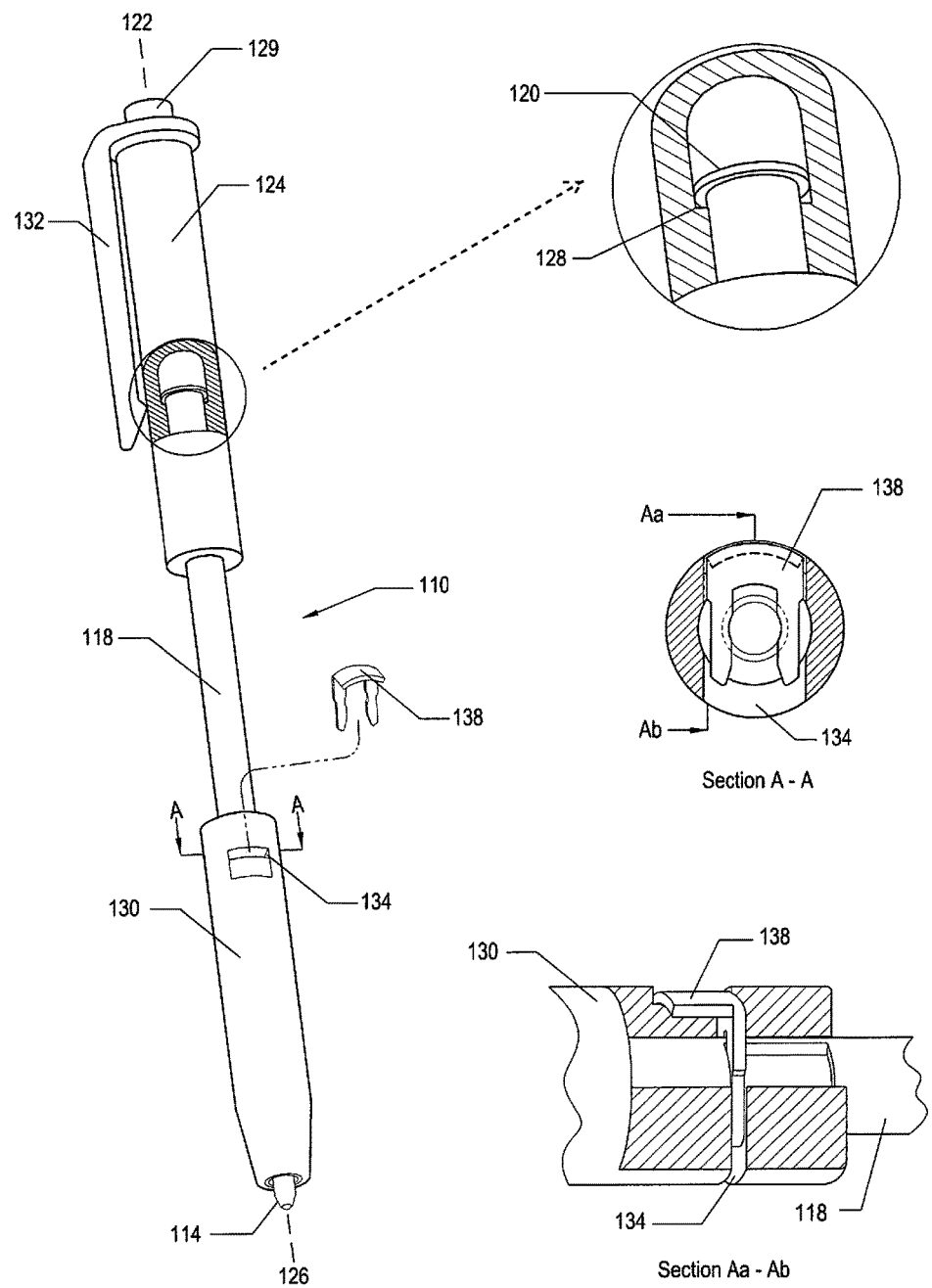
FIG. 1 is a perspective drawing with cutaway detail of a ball point pen embodiment of the present invention.

FIG. 1 depicts the ballpoint pen 110 embodiment of the present invention. Here, a writing cartridge 114 is slidably inserted into a guide tube 118. The guide tube has an outwardly extending flange 120 formed at its distal end. A groove (not visible in this view) is formed peripherally around the circumference of the writing cartridge. (See FIG. 3 for additional detail). An upper pen body 124 is slidably fit and inserted over the guide tube 118 from the writing end 126. By virtue of a counterbore 128 formed inside the upper pen body, the upper pen body is stopped at the extended position as shown. At least one aperture is cut through the guide tube [not visible in this view]. A lower external pen body 130 is slidably fit over the guide tube 118. A slot opening 134 in the lower pen body 130 aligns with the aperture or apertures in the guide tube and the circumferential groove in the writing cartridge 114 allowing a retaining clip 138 to be inserted and snap around the writing cartridge 114 through the aperture or apertures, mechanically connecting it to the lower external pen body 130. In this example, each tang of the U-shaped retaining clip 138 is inserted through each opposing aperture and engages the circumferential groove of the writing cartridge 114. The dimensions of the opposing apertures determine the limit of movement of the writing cartridge 114 when moving the pen body in relation to the guide tube. The length of the opposing apertures should allow the writing point to extend an adequate distance past the lower opening of the pen body to permit convenient writing, and retract an adequate distance into the guide tube to protect it.

The U-shaped retaining clip 138, therefore, is a connecting means securing the lower pen body 130 to the writing cartridge 114.

Movement of the lower external pen body 130 downward moves the writing cartridge 114 writing end 126 downward, exposing the writing end 126 out of the guide tube 118. Movement of the lower external pen body 130 upward (toward the distal end 122), retracts the writing end 126 of the writing cartridge 114 into the guide tube 118, while simultaneously shortening the overall length of the ballpoint pen. Additionally, when the external upper pen body 124 is moved toward the writing end 126, the overall length the ball point pen is additionally shortened. Adequate friction should be provided between the writing cartridge 114 and the guide tube 118 and/or between the lower external pen body 130 and the guide tube 118 to hold the pen in the open or closed positions for use or storage respectively, but allow convenient relative movement of the component parts. This may be accomplished by a number of methods well known to one of ordinary skill in the art, such as crimping the guide tube 118 or slotting the writing end of the guide tube 118 so that swaging the writing end of the external pen body 130 would compress the slotted end of the guide tube 118 against the writing cartridge 114. An end cap 129 is inserted in the distal end of the upper pen body 124. The present invention can be manufactured without the upper pen body 124, using the guide tube 118 as the functional upper portion of the pen (see FIG. 2). However, it is considered beneficial to use an upper pen body 124 as shown to make it easier and more comfortable to hold the pen 110 when using it. It is further beneficial to incorporate a pocket retaining clip 132 as part of the upper pen body 124.

Figure 2:
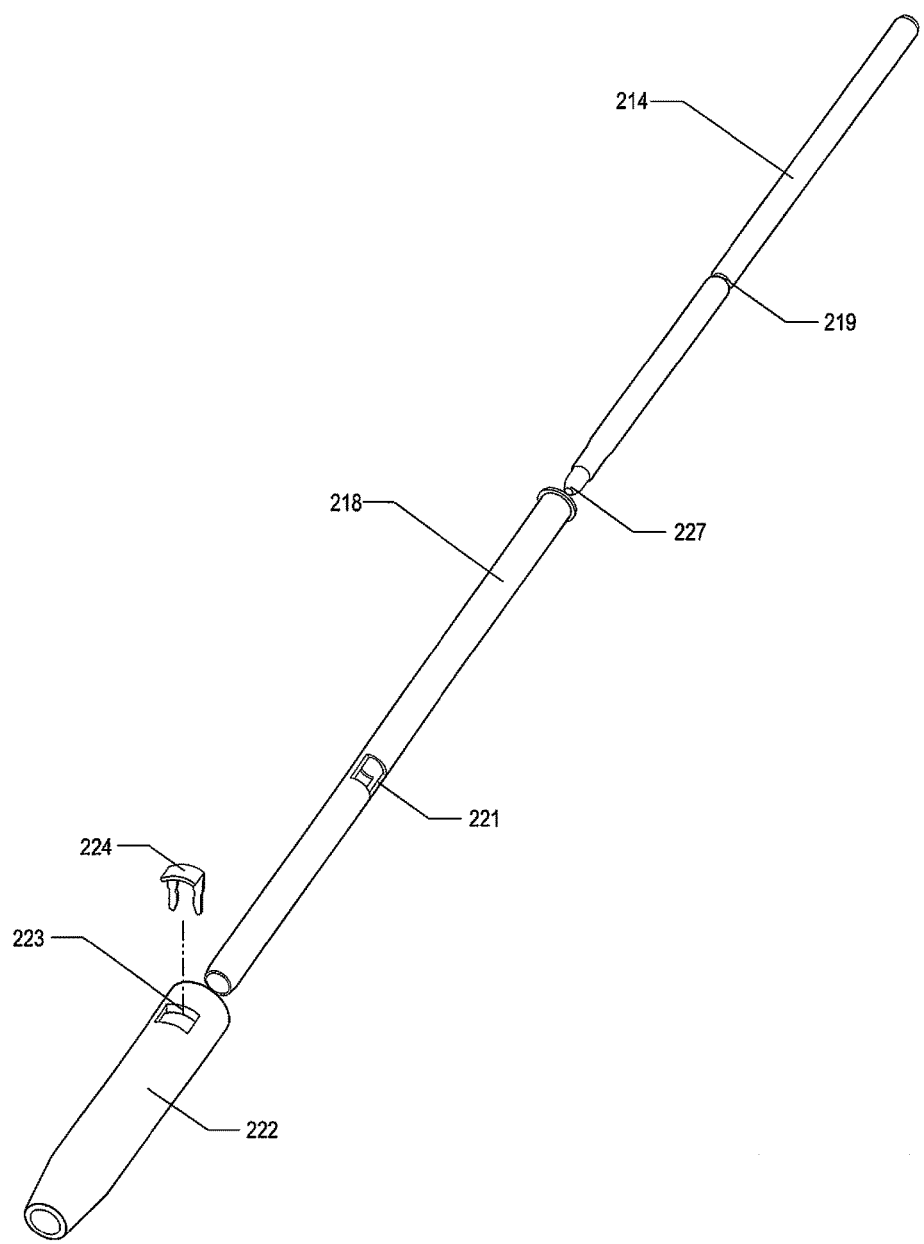
FIG. 2 is an exploded view of a ball point pen embodiment of the present invention made with the minimized number of component parts.

FIG. 2 is an exploded view of a ball point pen representing a simplified embodiment of the present invention made with the minimized number of component parts. A writing cartridge 214 is slidably inserted into a guide tube 218. The writing cartridge has a groove 219 formed circumferentially around its perimeter. The guide tube 218 has opposing apertures 221 in its periphery. An external pen body 222 having a slot opening 223 in its perimeter is inserted over the guide tube 218. The slot opening 223 and the opposing apertures 221 are aligned with the circumferential groove 219 and a U-shaped retaining clip 224 is inserted through the slot opening 223 and the opposing apertures 221, engaging the writing cartridge 214 in the circumferential groove 219. In this example, each tang of the U-shaped clip 224 is inserted into each opposing aperture 221. As in FIG. 1, movement of the pen body 222 downward moves the retaining clip 224, and thus the writing cartridge 219 downward in relation to the guide tube 218. As described in FIG. 1, but more clearly visible in FIG. 2, the dimensions of the opposing apertures 221 determine the limit of movement of the writing cartridge 214 when moving the pen body 222 in relation to the guide tube 218. The length of the opposing apertures 221 should allow the writing point 227 to extend an adequate distance past the lower opening of the pen body to permit convenient writing, and retract an adequate distance into the guide tube 218 to protect it. It should be noted that the present embodiment or the others disclosed here may be manufactured using a single aperture 221 in the guide tube and a pin, single-prong clip or other interconnecting element in place of the U-shaped clip 224, engaging the writing cartridge 214 through the aperture. Such variations would be obvious to one of ordinary skill in the art and the disclosure of the U-shaped clip 224 is not intended to limit the scope of the means of connecting the external pen body 222 to the writing cartridge 214 which can be accomplished with a wide variety of alternative structures well known in the industry.

Figure 3:
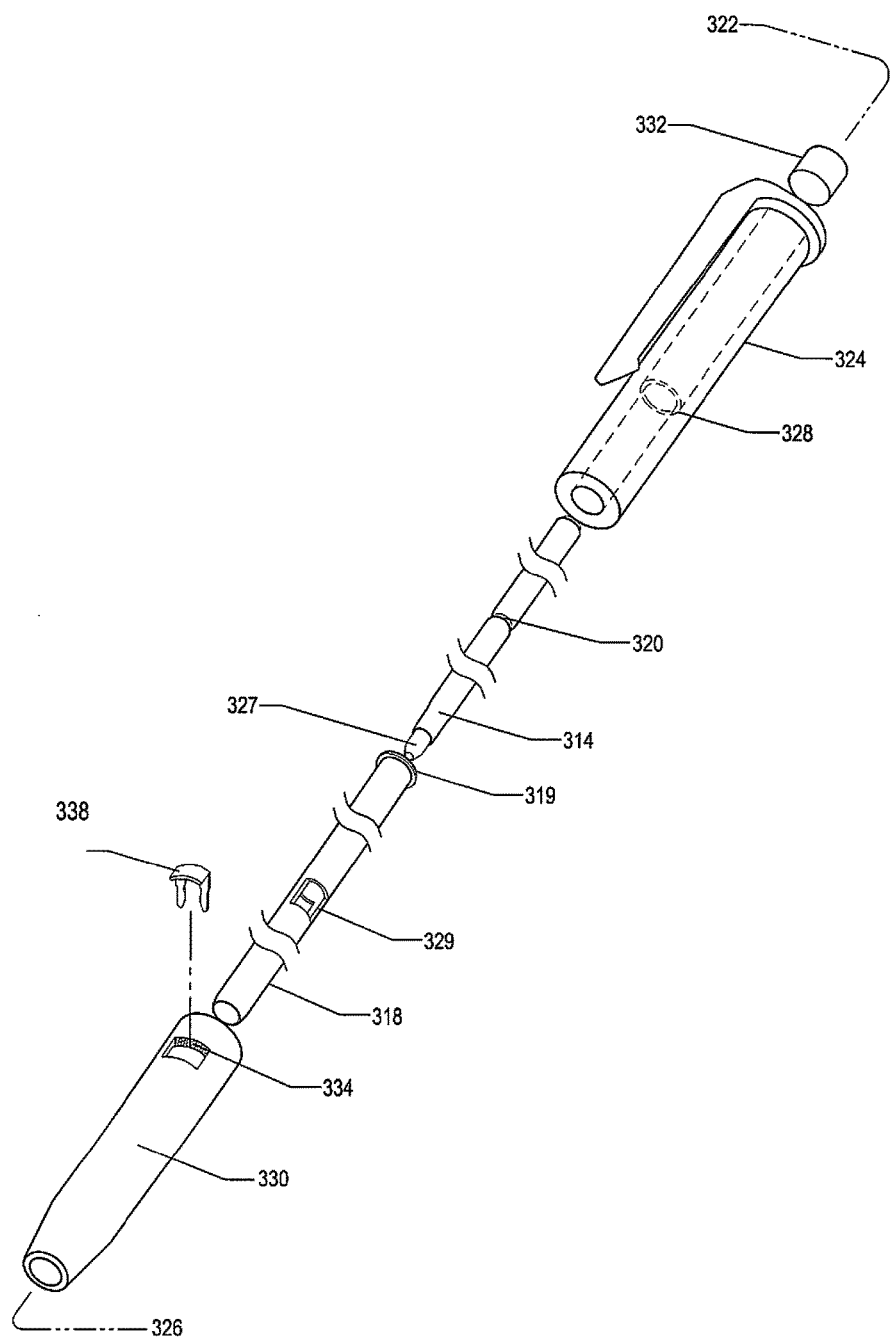
FIG. 3 is an exploded view of a ball point pen embodiment of the present invention including an upper pen body.

FIG. 3 is an exploded view representing a ball point pen embodiment of the present invention including an upper pen body. In this example, identical to FIG. 1, fully illustrated is the assembly of this embodiment. A writing cartridge 314 is slidably inserted into a guide tube 318. The guide tube 318 has a radially-formed outwardly extending flange 319 at its distal end. A groove 320 is formed circumferentially around the writing cartridge 314. An upper pen body 324 is slidably fit and inserted over the guide tube 318 from the guide tube's writing end 326. By virtue of a counterbore 328 formed inside the upper external pen body 324, the upper pen body 324 is stopped at the extended position when the guide tube's outwardly extending flange 319 engages the upper pen body's 324 counterbore 328. Opposing apertures 329 are cut through the guide tube 318. A lower external pen body 330 is slidably fit over the guide tube 318. A slot opening 334 in the lower pen body 330 aligns with the opposing apertures in the guide tube and the circumferential groove 320 in the writing cartridge 314 allowing a U-shaped retaining clip 338 to be inserted through the slot opening 334 and each tang of the U-shaped clip 338 is inserted through each opposing aperture 329, snapping around and engaging the writing cartridge 314 within the circumferential groove 320, mechanically connecting it to the lower external pen body 330. Movement of the lower external pen body 330 downward moves the writing cartridge 314 writing end 327 downward, exposing it out of the guide tube 318. Movement of the lower external pen body 330 upward (toward the distal end 322), retracts the writing end 327 of the writing cartridge 314 into the guide tube 318, while simultaneously shortening the overall length of the ballpoint pen assembly. Additionally, when the external upper pen body 324 is moved toward the writing end 326, the overall length of the ball point pen is additionally shortened.

The dimensions of the opposing apertures 329 determine the limit of movement of the writing cartridge 314 when moving the pen body 330 in relation to the guide tube 318. Ideally the length of the opposing apertures 329 should allow the writing point 327 to extend an adequate distance past the lower opening of the pen body 330 to permit convenient writing, and retract an adequate distance into the guide tube 318 to protect it. Adequate friction is provided between the pen body 330 and the guide tube 318 and/or between the writing cartridge 314 and the guide tube 318 to hold the pen in the extended position or contracted position for writing or storage receptively, but allow convenient relative movement of the component parts. Methods and structures of providing friction may include crimping the guide tube 318 so as to cause it to rub against the writing cartridge 314, sizing the bore of the lower external pen body 330 to cause it to friction-fit with the guide tube 318 or inserting a spring element between the lower external pen body 330 and the guide tube 318. Such means of providing adequate friction, including a wide variety of alternative means, would be obvious to one of ordinary skill in the art and are not intended to limit the scope of the patent.

An end cap 332 is inserted in the distal end of the upper pen body 324. It should be noted that the present embodiment or the others disclosed here may be manufactured using a single aperture 329 in the guide tube and a pin, screw, single-prong clip or other interconnecting element in place of the U-shaped clip, engaging the writing cartridge 314 through the aperture. Such variations would be obvious to one of ordinary skill in the art.

Figure 4A:
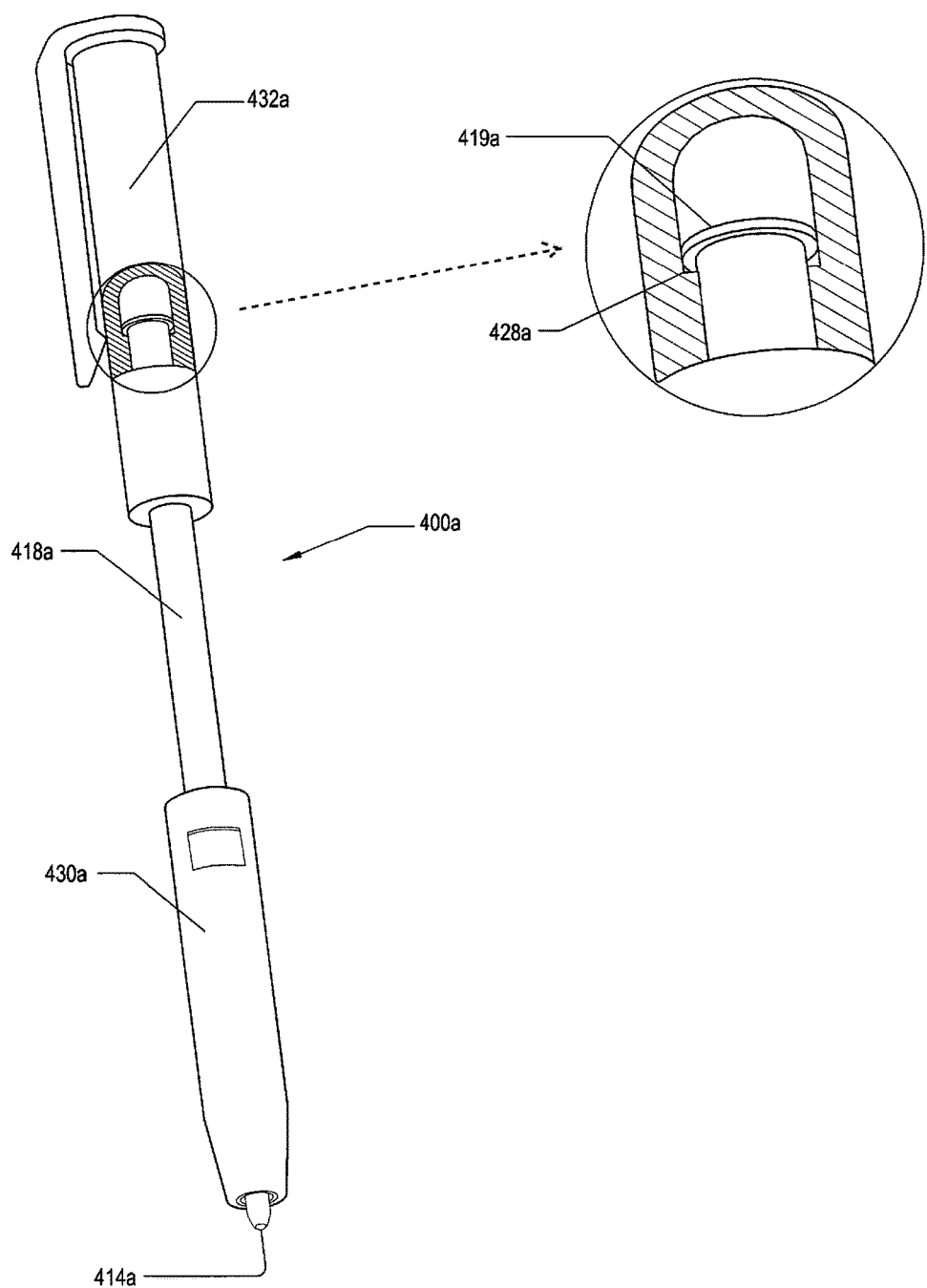
FIG. 4a is a perspective view with cutaway detail of the ball point pen embodiment of the present invention in the extended position.

FIG. 4a is a view of the ball point pen 400a embodiment of the present invention in the extended position. The writing end of the writing cartridge 414a is exposed, extended outside the guide tube 418a and lower external pen body 430a. The upper external pen body 432a is extended to the stop formed by the outwardly extending flange 419a formed in the distal end of the writing cartridge coming into contact with the counterbore 428a of the upper external pen body 432a.

Figure 4B:
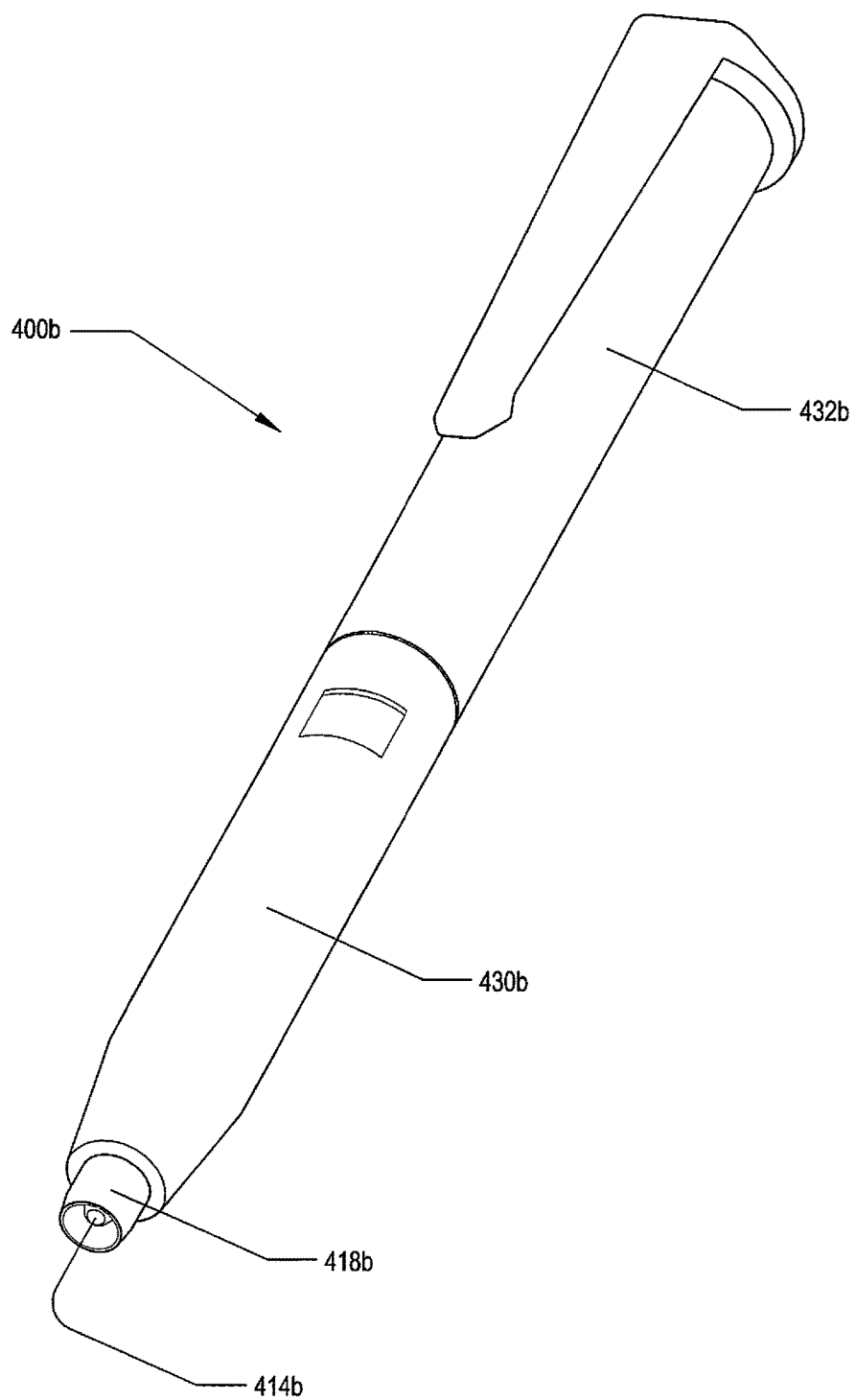
FIG. 4b is a perspective view of the ball point pen embodiment of the present invention in the contracted position.

FIG. 4b is a view of the ball point pen 400b embodiment of the present invention in the contracted position. The writing end of the writing cartridge 414b is contracted inside the guide tube 418b and lower external pen body 430b. The upper external pen body 432b is contracted downward along the guide tube 418b shortening the overall length of the pen assembly 400b.

Figure 5A:
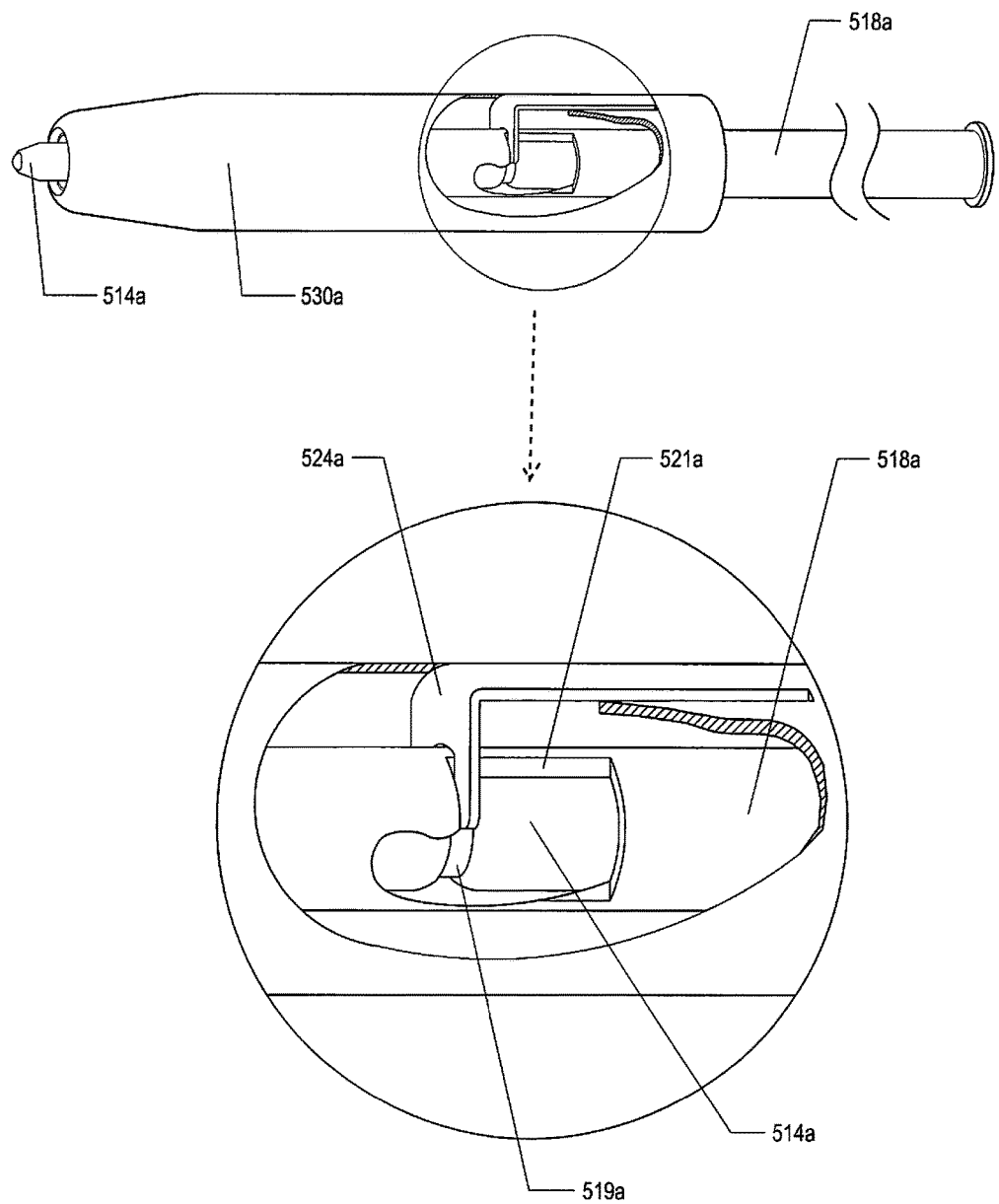
FIG. 5a is a perspective view with cutaway detail of an alternative embodiment of the present invention utilizing a metal exterior pen housing with an integral spring clip.

FIG. 5a is a perspective view with cutaway detail of an embodiment of the present invention utilizing a metal lower external pen body 530a. In contrast with the embodiment described in the above figures, a separate clip to engage the writing cartridge 514a is not used. Instead, a spring clip 524a is formed as part of the metal lower pen body 530a and becomes the connecting means to connect the external pen body 530a with the writing cartridge 514a. As in the previous examples, the writing cartridge 514a incorporates a circumferential groove 519a into which the spring clip 524a engages. When the lower external pen body 530a is pulled down toward the writing end, the spring clip 524a draws the pen cartridge 514a down the length of the aperture 521a formed in the guide tube 518a, extending it out of the guide tube. The spring clip 524a may also be made as a separate part and fixed to the lower pen body 530a by means well-known in the art such as welding, friction insertion or gluing. In all other respects, this embodiment is similar to the previously described embodiments.

Figure 5B:
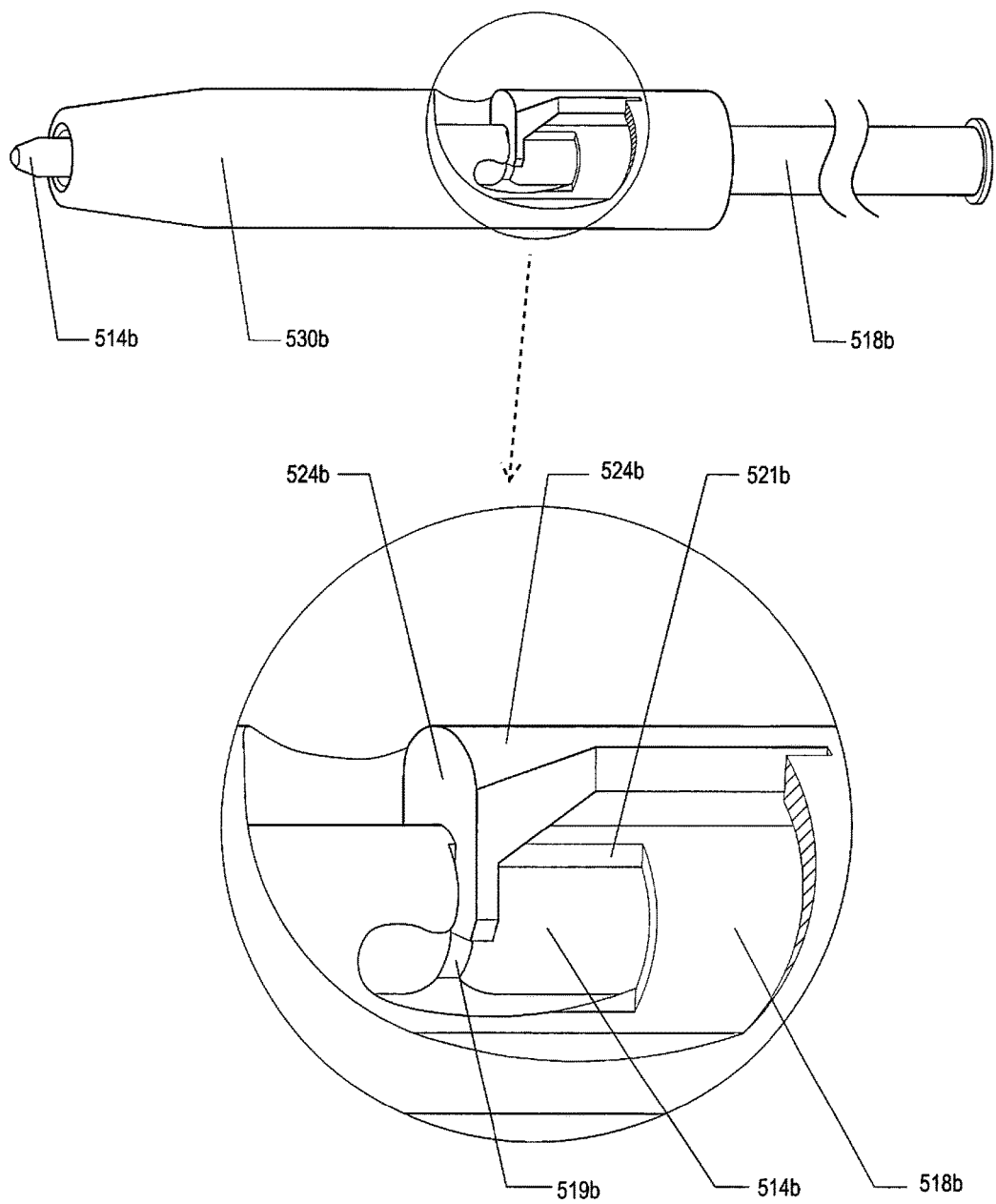
FIG. 5b is a perspective view with cutaway detail of an alternative embodiment utilizing a plastic exterior pen housing having an integral plastic spring clip.

FIG. 5b is a perspective view with cutaway detail of an alternative embodiment utilizing a plastic exterior pen housing with an integral plastic spring clip. As in FIG. 5a, a separate clip is not needed as a connecting means to mechanically connect the external pen body 530b to the writing cartridge 514b. Instead, a spring clip 524b is formed as part of the plastic external pen body 530b. The spring clip 524b incorporates a protrusion 525b which extends through an aperture 521b in the guide tube 518b and engages the circumferential groove 519b in the writing cartridge 514b. Movement of the external pen body 530b in a downward direction will move the writing cartridge 514b downward until the spring clip 524b comes in contact with the lower edge of the aperture 521b, causing the writing tip of the writing cartridge 514b to protrude out of the guide tube 518b.

Advantageously, this embodiment uses a reduced number of parts and can be made with low-cost manufacturing methods. Additionally, since no spring steel is utilized, corrosion and rusting is eliminated. Both embodiments illustrated in FIGS. 5a and 5b will also benefit from the addition of an upper pen body such as illustrated in FIG. 3.

Figure 6A:
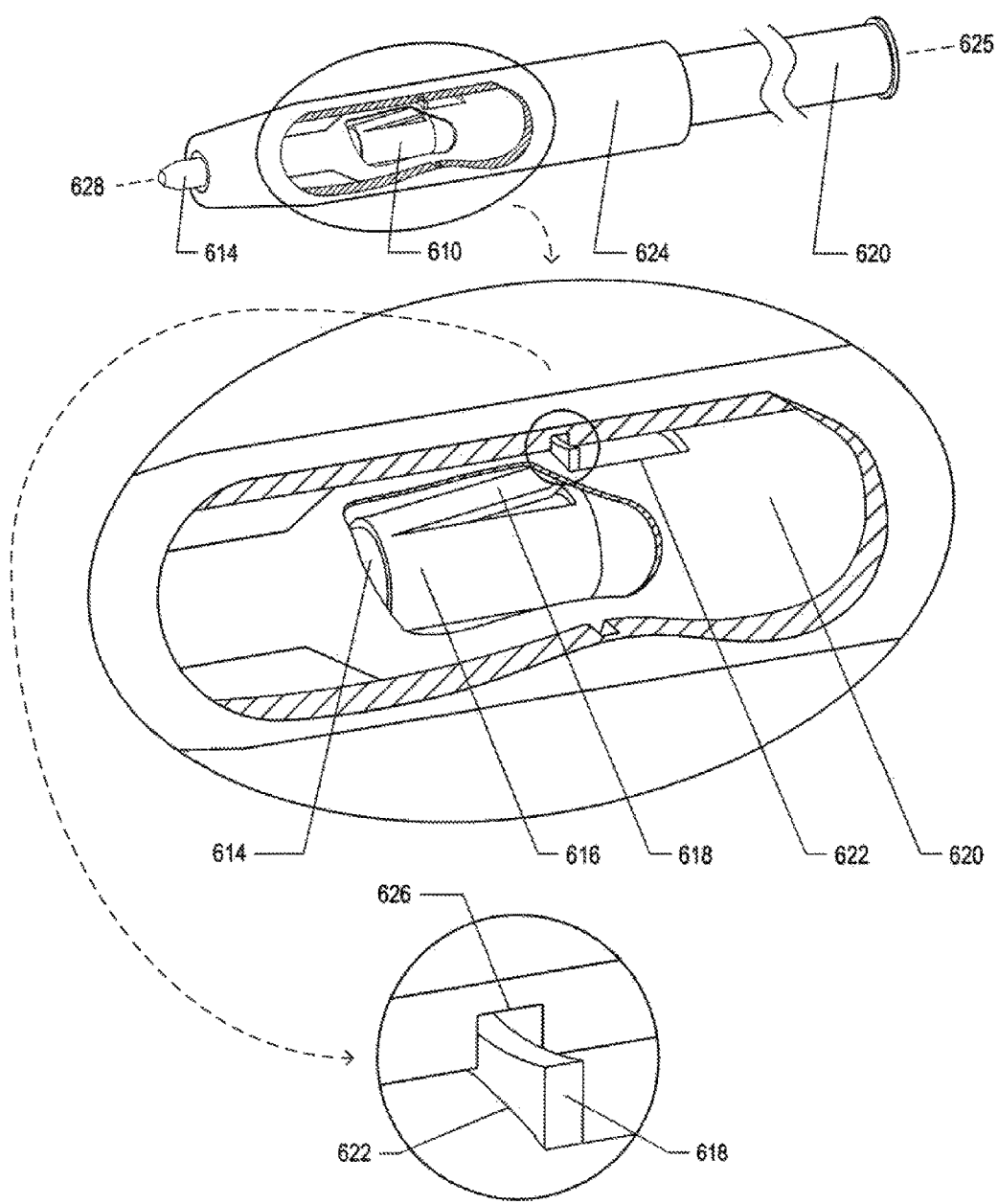
FIG. 6a is a perspective view with cutaway detail of an alternative embodiment of the present invention using a spring clip fitted to the ink refill.

FIG. 6a is a perspective view with cutaway detail of an alternative embodiment of the present invention using a spring clip 610 assembly press-fit or otherwise attached to the writing cartridge 614. In this embodiment of the present invention the spring clip 610 comprises a tubular portion 616 with a protruding spring arm 618. The assembly comprising the spring clip 610 attached to the writing cartridge 614 is inserted into a guide tube 620 containing an aperture 622 through which the protruding spring arm 618 protrudes. The guide tube 620 containing the writing cartridge 614 with the spring clip 610 attached is inserted into an external pen body 624. The external pen body 624 contains an indentation 626 in its inner wall configured to accept the end of the protruding spring arm 618. When the external pen body 624 is drawn downward by the user its movement is stopped by the lower edge of the aperture 622 formed in the guide tube 620 and the movement extends the writing end 628 of the writing cartridge 614 out of the guide tube 620. The guide tube 620 and external pen body 624 can be made of a variety of materials including plastic or metal. The spring clip may also be made of plastic but will be more resilient if made of metal. When the user moves the pen body 624 upward (toward the distal end 625), the writing cartridge 614, by virtue of its connection to the pen body 624 via the spring clip 610, is drawn up into the guide tube 620. The length of the movement up into the guide tube 620 is determined by the dimensions of the aperture 622 as the movement is stopped by the upper edge of the aperture 622. A protruding spring arm 618 may be attached to the writing cartridge 614 in a variety of ways that will be well-known to one skilled in the art such as press-fitting, spot welding or gluing. Moreover, the spring clip may be manufactured using either metal or plastic. An upper pen body is preferably added to this embodiment as more fully described in FIGS. 1, 3, 4a, 4b, and 7, any of which configuration is adaptable to this embodiment.

Figure 6B:
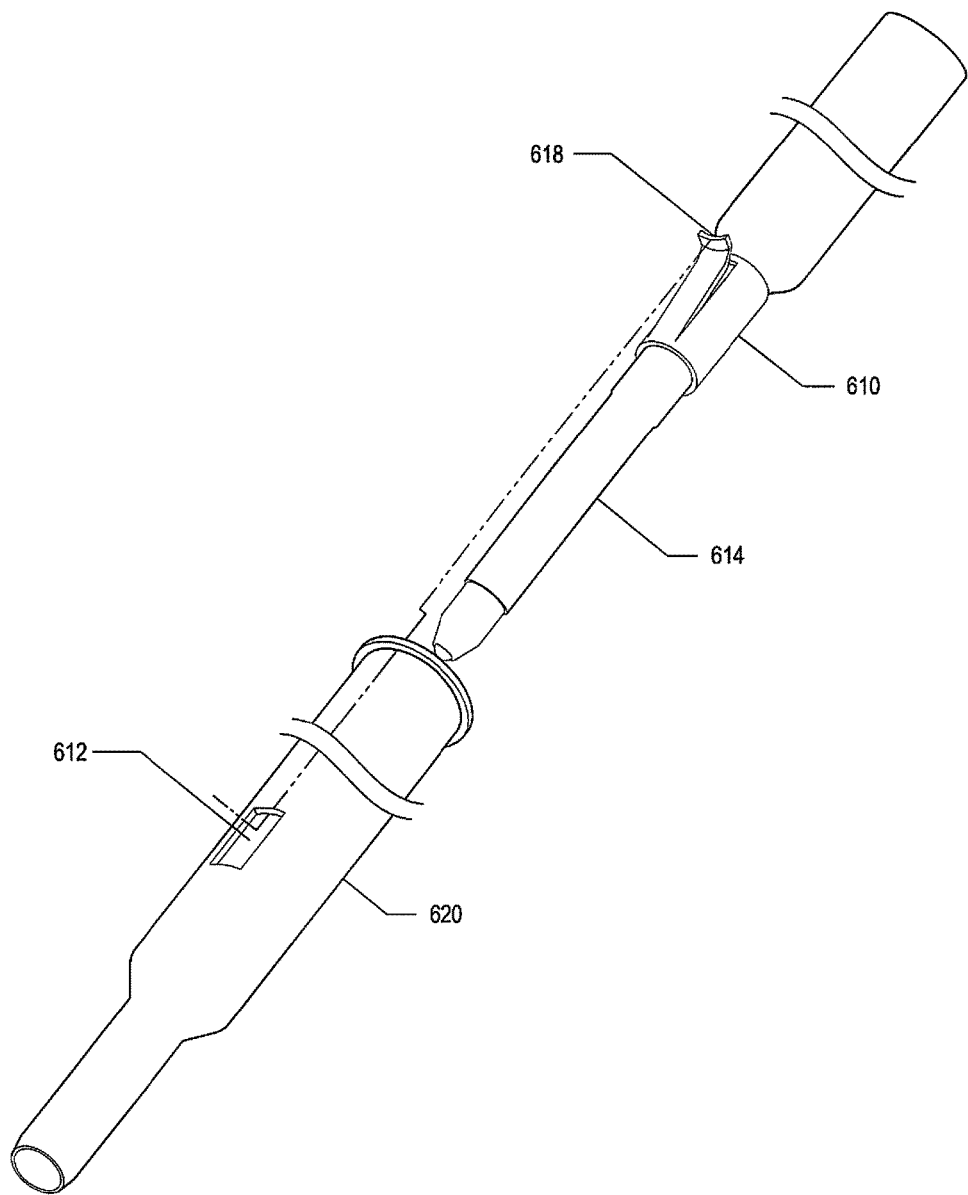
FIG. 6b is an exploded view of an alternative embodiment of the present invention using a spring clip fitted to the ink refill.

FIG. 6b is an exploded view of the embodiment described by FIG. 6a. It may be seen spring clip assembly 610 is affixed to the narrower lower portion of the writing cartridge 614. The combined writing cartridge 614 and spring clip assembly 610 is inserted into the distal end of the guide tube 620 until the spring clip arm 618 snaps into the aperture 622 of the guide tube 620.

Figure 7:
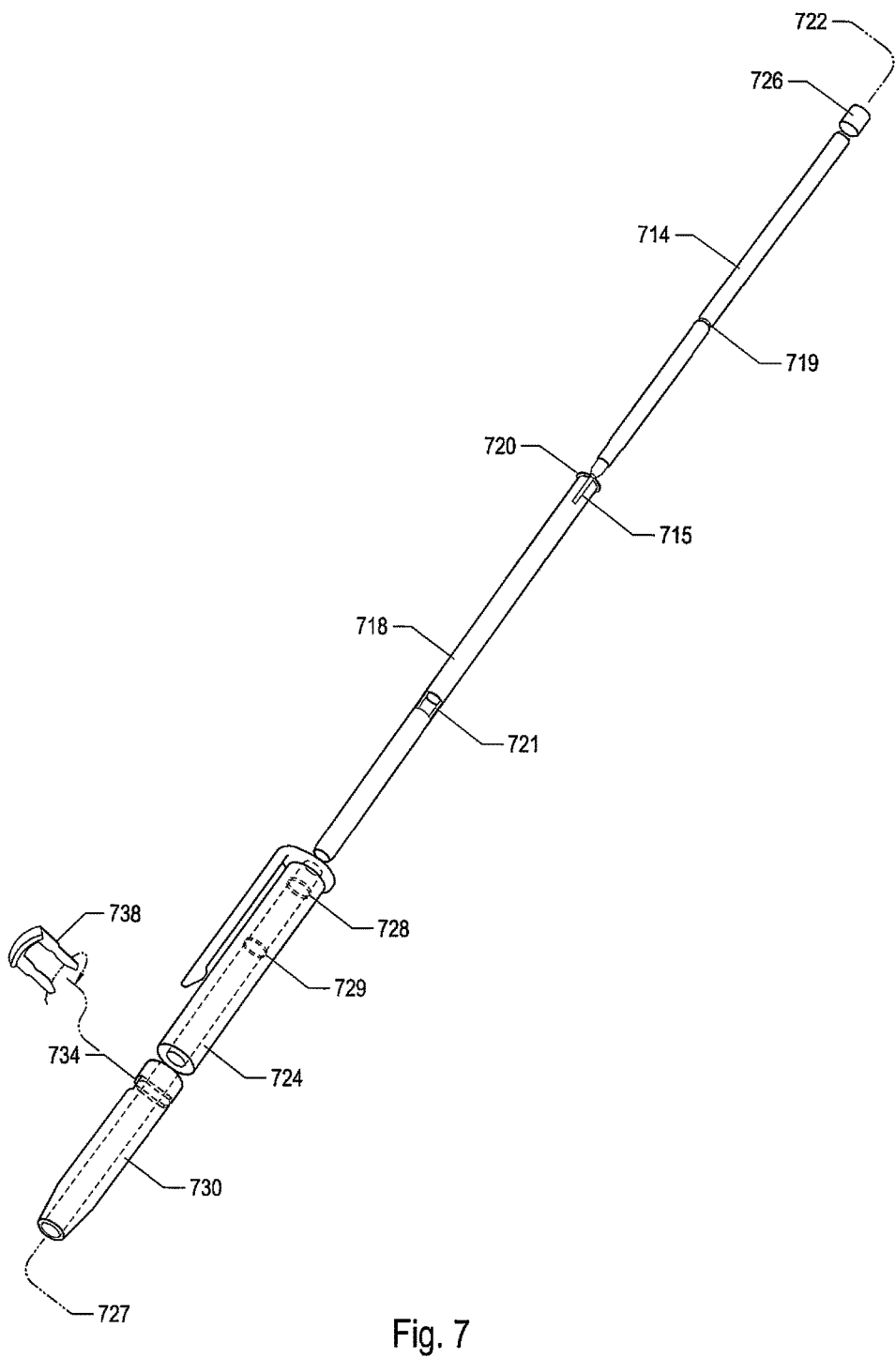
FIG. 7 is an exploded a view of an embodiment of an optional upper portion of the present invention having position selection detents.

FIG. 7 is an exploded view of a pen embodiment of the present invention having an optional upper portion with position selection detents. In this variation, a writing cartridge 714 is slidably inserted into a guide tube 718. As in FIG. 1, the guide tube has an outwardly extending flange 720 formed at its distal end, but the flange 720 and distal end are slit longitudinally allowing the distal end to resiliently compress.

A groove 719 is formed circumferentially around the periphery of the writing cartridge. An upper pen body 724 is slidably fit and inserted over the guide tube 718 from the writing end 726. The guide tube 718 is longer than the writing cartridge 714 to allow contraction of the pen. Invaginated detents 728 and 729 are formed inside the upper pen body. As the guide tube 718 moves within the upper pen body 724, the outwardly extending compressible split flange 720 indexes into one of the detents 728 or 729. A pair of opposing apertures 721 are formed through the guide tube 718. A lower external pen body 730 is slidably fit over the guide tube 718. A slot opening 734 in the lower pen body 730 aligns with the opposing apertures 721 in the guide tube and the circumferential groove 719 in the writing cartridge 714 allowing each of the tangs of the U-shaped retaining clip 738 to be inserted through the slot opening 734 and each of the opposing apertures 721, and snap around and engage with the writing cartridge 714 within the circumferential groove 719, mechanically connecting it to the lower external pen body 730. Movement of the lower external pen body 730 downward moves the writing cartridge 714 writing end 727 downward, exposing it out of the guide tube 718. The compressible flange 720 snaps into the lower detent 729 holding the apparatus in the open position for use. Movement of the lower external pen body 730 upward (toward the distal end 722), retracts the writing end 727 of the writing cartridge 714 into the guide tube 718, while simultaneously shortening the overall length of the ballpoint pen. The compressible split flange 720 snaps into the upper detent 728 holding the apparatus in the retracted position for storage. Additionally, when the external upper pen body 724 is moved toward the writing end 727, the overall length of the ball point pen is further shortened. An optional end cap 726 is inserted in the distal end 722 of the upper pen body 724 to exclude dirt.

Figure 8:
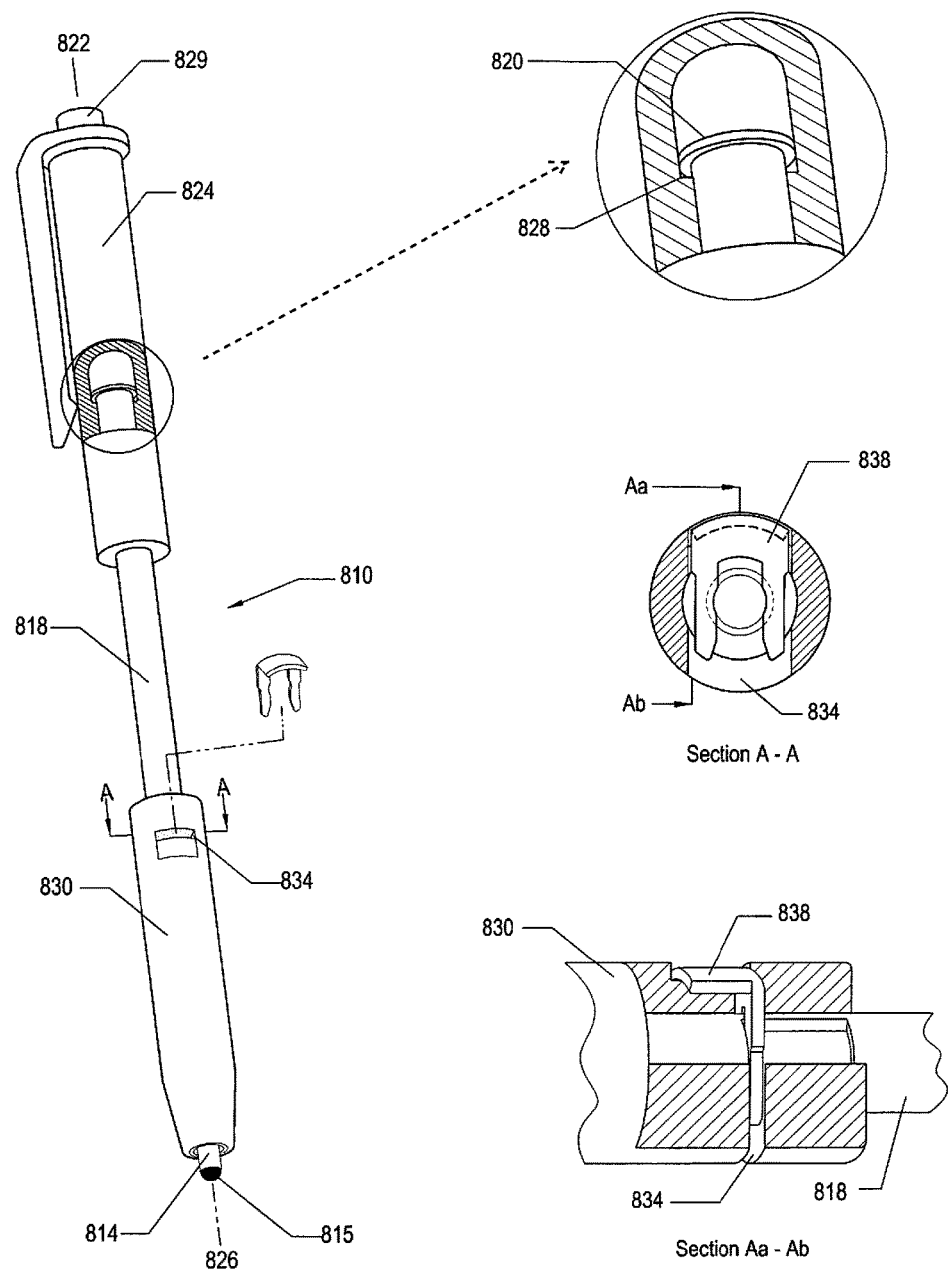
FIG. 8 is a perspective view of a computer input stylus embodiment of the present invention.

FIG. 8 is a view of an embodiment of the present invention as a computer input stylus. It may be seen that any of the embodiments shown herein may be adapted to a computer stylus or similar device with very little departure from the teachings herein. FIG. 8 is one such adaptation and is not intended to limit such adaptations to this embodiment or to dedicate any obvious variations to the public.

Specifically, FIG. 8 depicts a computer interface (touch screen) stylus 810 embodiment of the present invention. A stylus insert (the analog of a writing cartridge disclosed herein) comprising a stylus shaft 814 and a stylus tip 815. The stylus shaft 814 is slidably inserted into a guide tube 818. The guide tube has an outwardly extending stop flange 820 at its distal end. A groove (not visible in this view) is formed circumferentially around the stylus shaft along its length. An upper stylus body 824 is slidably fit and inserted over the guide tube 818 from the writing end 815. By virtue of a counterbore 828 formed inside the upper stylus body, the upper stylus body is stopped at the extended position as shown. As in the prior embodiments, opposing apertures (not visible in this view) are cut through the guide tube 818. A lower external stylus body 830 is slidably fit over the guide tube 818. A slot opening 834 in the lower stylus body 830 aligns with the opposing apertures in the guide tube 818 and the circumferential groove in the stylus shaft 814 allowing each of the 2 tangs of a U-shaped retaining clip 838 to be inserted through each of the opposing apertures in the guide tube 818 and snap around a circumferential groove in the stylus shaft 814, mechanically engaging the lower external stylus body 830. Movement of the lower external stylus body 830 downward moves the stylus writing end 815 downward, exposing it out of the guide tube 818 and lower external stylus body 830. Movement of the lower external stylus body 830 upward (toward the distal end 822), retracts the writing end 815 of the stylus insert 814 into the guide tube 818 and lower external stylus body 830, while simultaneously shortening the overall length of the stylus 819. The amount of movement of the stylus shaft 814 is limited by the dimensions of the opposing apertures. Additionally, when the external upper stylus body 824 is moved toward the writing end 826, the overall length the stylus is additionally shortened. An end cap 828 is inserted in the distal end of the upper stylus body 824. The present invention can be manufactured without the upper stylus body 824, using the guide tube 818 as the upper portion of the stylus. However, it is considered beneficial to use an upper stylus body 824 as shown to make it easier and more comfortable to hold the stylus 810. It can be beneficial to incorporate a pocket retaining clip 832 as part of the upper stylus body 824. Similarly, a stylus insert may be substituted for the writing cartridge in any of the foregoing embodiments. As discussed above, it should be noted that a single aperture may be used in the side of the guide tube 818 to permit a single-prong clip, pin or similar device to engage the stylus. For example, a screw or pin may be inserted into the stylus shaft 814 through a hole in the external stylus body 830 and the aperture [not visible] in the stylus shaft 814.

The specific implementations disclosed above are by way of example and for enabling persons skilled in the art to implement the invention only. We have made every effort to describe all the embodiments we have foreseen. There may be embodiments that are unforeseeable or which are insubstantially different. We have further made every effort to describe the invention, including the best mode of practicing it. Any omission of any variation of the invention disclosed is not intended to dedicate such variation to the public, and all unforeseen or insubstantial variations are intended to be covered by the claims appended hereto. Accordingly, the invention is not to be limited except by the appended claims and legal equivalents.

What is claimed is:

1. A telescoping writing implement that telescopes from a shortened configuration to a lengthened configuration comprising:
   a writing cartridge having a writing tip;
   a least one outer pen body;
   a guide tube disposed circumferentially around the writing cartridge, the guide tube configured with the writing tip within the guide tube when the writing implement is in the shortened configuration and the writing tip exposed from the guide tube when the writing implement is in the lengthened configuration; and
   a retaining member engaging the writing cartridge and the retaining member also engaging or formed from the outer pen body, the engagement of the retaining member to the writing cartridge causing the writing tip to be exposed from the guide tube when the writing implement is in the lengthened configuration.

2. The telescoping writing implement of claim 1 wherein the writing cartridge is a ball point pen ink cartridge.

3. The telescoping writing implement of claim 1 wherein the writing cartridge is a computer interface stylus.

4. The telescoping writing apparatus of claim 1 further comprising detent means in or part of the external pen body, detent means configured to assist in holding the telescoping writing apparatus in the open or closed positions.

5. A telescoping writing apparatus comprising:
   a writing cartridge having a peripheral indentation and a writing tip;
   a guide tube surrounding the writing cartridge, the guide tube further having at least one peripheral aperture;
   an upper external pen body having first detent means and second detent means;
   a lower external pen body, the lower external pen body movably fit over the guide tube, the lower external pen body having an opening at an end opposing the upper external pen body, through which the writing tip is selectively exposed;
   a retainer device, engaging the peripheral indentation in the pen cartridge such that movement of the lower external pen body longitudinally along the guide tube moves the pen cartridge within the guide tube to expose the writing tip by virtue of the retainer device engaging the lower external pen body to the pen cartridge and the first detents means and the second detent means are configured to cooperate to hold the telescoping writing apparatus in the open or closed positions.

6. The apparatus of claim 5 wherein the guide tube further comprises an outwardly-extending flange at one end.

7. The apparatus of claim 5 further comprising a cap, the cap inserted into the upper external pen body.

8. The apparatus of claim 5 wherein movement of the lower external pen body toward the upper external pen body moves the writing tip of the pen cartridge to a retracted position within the guide tube, and movement of the lower external pen body away from the upper external pen body exposes the writing tip of the pen cartridge.

9. The apparatus of claim 5 wherein the upper external pen body is fit over the guide tube.

10. The apparatus of claim 5 further comprising a pocket retaining clip.

11. The apparatus of claim 5 wherein the writing cartridge is a computer input stylus.

12. The apparatus of claim 5 wherein the writing cartridge is a felt tip pen.

13. A telescoping writing apparatus comprising:
    a writing cartridge, the cartridge further comprising a peripheral indentation and a writing tip;
    a guide tube surrounding the writing cartridge, the guide tube further comprising at least one peripheral aperture;
    an upper external pen body;
    a lower external pen body, wherein either or both of the lower external pen body and the upper external pen body are movably fit over the guide tube, the lower external pen body or the upper external pen body further comprising at least one peripheral aperture and the lower external pen body having an opening, at an end opposing the upper external pen body, through which the writing tip is selectively exposed;
    a retainer device, the retainer device inserted through the at least one peripheral aperture in the lower external pen body or the upper pen body, and into the peripheral indentation in the pen cartridge wherein movement of the lower external pen body or the upper external pen body longitudinally along the guide tube moves the pen cartridge within the guide tube to expose the writing tip by virtue of the retainer device mechanically engaging the lower external pen body to the pen cartridge.

14. The apparatus of claim 13 wherein the guide tube further comprises an outwardly-extending flange at one end.

15. The apparatus of claim 13 further comprising a cap, the cap inserted into the upper external pen body.

16. The apparatus of claim 13 wherein movement of the lower external pen body toward the upper external pen body moves the writing tip of the pen cartridge to a retracted position within the guide tube, and movement of the lower external pen body away from the upper external pen body exposes the writing tip of the pen cartridge.

17. The apparatus of claim 13 further comprising female detent means in the external pen body and male detent means incorporated into the guide tube, the detents assisting in holding the telescoping writing apparatus in the open or closed positions.

18. The apparatus of claim 13 wherein the upper external pen body is fit over the guide tube.

19. The apparatus of claim 13 wherein the writing cartridge is a computer input stylus.

* * * * *